United States Patent [19]

Okada et al.

[11] Patent Number: 5,245,234
[45] Date of Patent: Sep. 14, 1993

[54] MOTOR

[75] Inventors: Tadashi Okada; Yoshio Fujii, both of Shiga, Japan

[73] Assignee: Nippon Densan Corporation, Kyoto, Japan

[21] Appl. No.: 808,210

[22] Filed: Dec. 13, 1991

[30] Foreign Application Priority Data

Dec. 28, 1990 [JP] Japan ................. 2-417258
May 16, 1991 [JP] Japan ................. 3-141177

[51] Int. Cl.$^5$ ................. H02K 5/24; H02K 7/14; H02K 11/00
[52] U.S. Cl. ................. 310/51; 310/67 R; 310/68 B; 359/198
[58] Field of Search ................. 310/51, 67 R, 68 B, 310/40 MM, 90, 268; 359/200, 216, 198

[56] References Cited

U.S. PATENT DOCUMENTS

| 4,594,524 | 6/1986 | Sudo | 310/268 |
| 4,626,727 | 12/1986 | Janson | 310/268 |
| 4,818,907 | 4/1989 | Shirotori | 310/67 R |
| 4,836,631 | 6/1989 | Shimazu et al. | 310/46 |
| 4,934,836 | 6/1990 | Tanaka et al. | 384/100 |
| 5,010,263 | 4/1991 | Murata | 310/68 B |
| 5,103,335 | 4/1992 | Sugiura | 310/90 |
| 5,128,571 | 7/1992 | Itsu | 310/67 R |
| 5,138,477 | 8/1992 | Omura et al. | 310/90 |

FOREIGN PATENT DOCUMENTS

| 0020178 | 12/1980 | European Pat. Off. | 310/68 B |
| 0200537 | 11/1986 | European Pat. Off. | 310/40 MM |
| 0126850 | 6/1987 | Japan | 310/40 MM |
| 0164017 | 7/1987 | Japan | 359/216 |
| 0250408 | 10/1987 | Japan | 310/40 MM |
| 0208622 | 8/1990 | Japan | 359/216 |

Primary Examiner—Steven L. Stephan
Assistant Examiner—C. LaBalle
Attorney, Agent, or Firm—McCormick, Paulding & Huber

[57] ABSTRACT

A scanning motor having a bracket, a shaft member secured to the bracket, a rotor rotatably supported by the shaft member via a pair of bearings and a polygonal mirror fastened to the rotor, the polygonal mirror being disposed at a position on the outside of either of a pair of the bearings. The rotor has a rotor body and a yoke member which constitutes a balance adjusting groove in cooperation with a frequency generating magnet fastened to the yoke member. A motor having a bracket, a rotor, magnetic force generating means disposed in the bracket, magnetic flux changing means fastened to the rotor, sensing means for sensing change in the magnetic flux taken place in a magnetic circuit constituted by the magnetic force generating means and the magnetic flux changing means and a covering member for covering the magnetic force generating means.

17 Claims, 4 Drawing Sheets

MOTOR

FIELD OF THE INVENTION

The present invention relates to a motor for use in a laser beam printer or the like.

Description of the Prior Art

A conventional scanning motor comprises a bracket, a shaft member which can be rotated with respect to the bracket, a rotor fastened to the shaft member, a rotor magnet fastened to the inner surface of the rotor and a stator fastened to the bracket to confront the rotor magnet, wherein the scanning polygonal mirror is fastened to the above-described shaft member.

However, a motor of the type described above is constituted in such a manner that the polygonal mirror is fastened to an end portion of the shaft member. Therefore, the overall height of the motor cannot be reduced and thereby the overall size of the motor cannot be reduced. Furthermore, in a case where the polygonal mirror is disposed as described above, a relatively large load acts on the above-described end portion of the shaft member. Therefore, another problem takes place in that the polygonal mirror cannot easily stably be supported.

A conventional motor of the type having a frequency generator is arranged in such a manner that a permanent magnet for use to perform the frequency generating operation is fastened to a rotor which can be rotated relatively to the bracket and as well as a frequency generating pattern is disposed on the bracket to confront the above-described permanent magnet.

However, in a case where the frequency generating permanent magnet is disposed as described above, there is a fear that magnetic powder of the permanent magnet will fly outwardly. Therfore, if the above-described motor is used in a hard disk apparatus or the like, the permanent magnet must be applied with a coating, causing the overall cost to rise.

Furthermore, the motor has a balance adjusting means provided for the rotor thereof for the purpose of adjusting the balance of the rotor after the motor has been assembled. However, the conventional balance adjusting means involves various problems to be overcome such as the too complicated structure.

Summary of the Invention

A first object of the present invention is to provide a scanning motor the overall size of which can be reduced by decreasing the overall height thereof.

A second object of the present invention is to provide a scanning motor capable of assuredly supporting a polygonal mirror thereof.

A third object of the present invention is to provide a motor in which flying of magnetic powder from a magnetic force generating means can assuredly be prevented.

A fourth object of the present invention is to provide a motor in which a balance adjusting means can be disposed while relatively simplifying the structure thereof.

Other and further objects, features and advantages of the invention will be appear more fully from the following description.

DETAILED DESCRIPTION OF PREFERRED EMBODIMENTS

Preferred embodiments of the present invention will now be described with reference to the drawings.

FIRST EMBODIMENT

Figure 1:
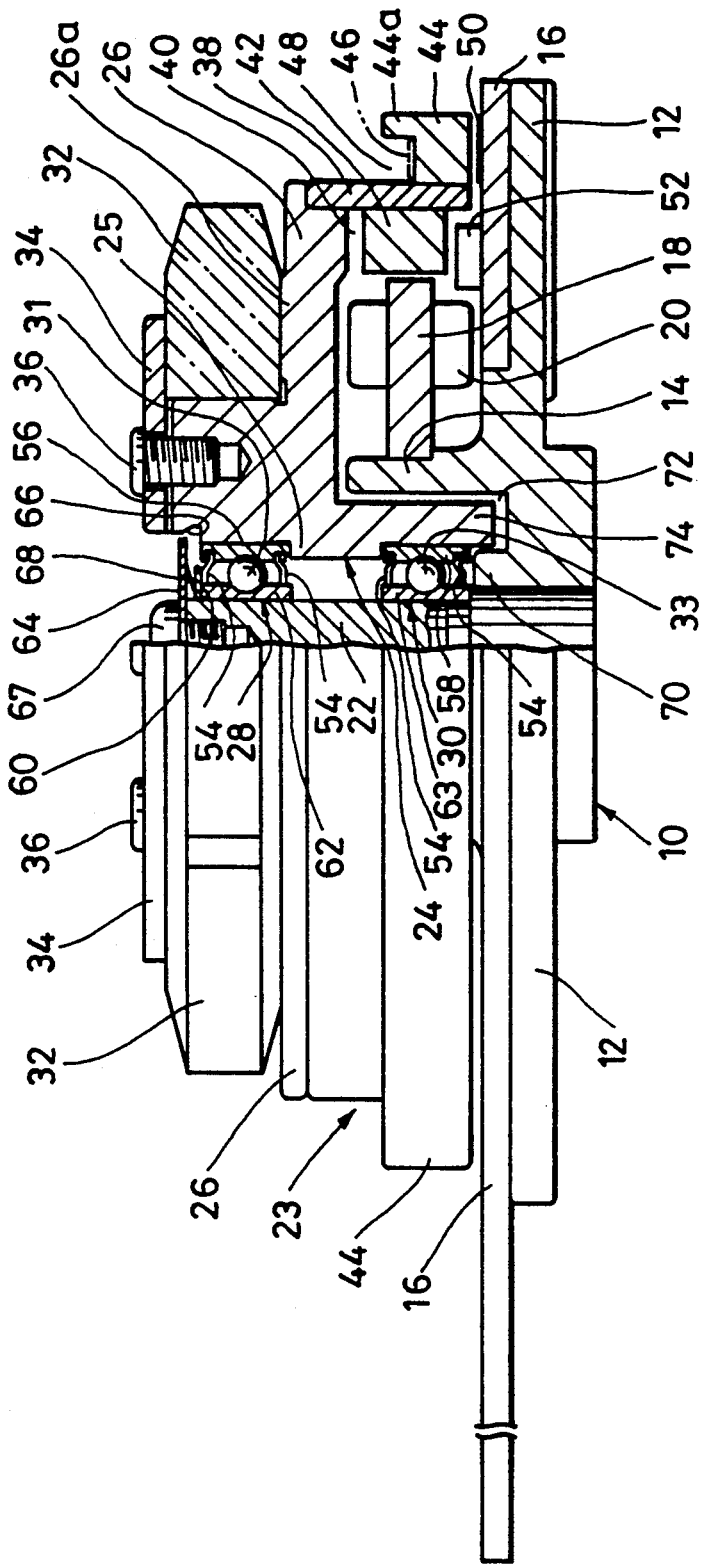
FIG. 1 is a cross sectional partial cutaway view which illustrates a first embodiment of a motor according to the present invention.

FIG. 1 illustrates a first embodiment of a spindle motor according to the present invention. A scanning motor shown in FIG. 1 has a bracket the overall body of which is represented by reference numeral 10. The bracket 10 comprises a flange portion 12 and an annular wall member 14. The annular wall member 14 is allowed to project upwards in the inside portion of the flange portion 12. A circuit substrate 16 is secured to the upper surface of the flange portion 12. Furthermore, a stator core 18 is secured to the outer surface of the wall member 14 and a stator coil 20 is formed around the stator core 18.

An end portion of a shaft member 22 is secured to the bracket 10 by a means such as press fitting. Furthermore, a rotor 23 is rotatably supported by the shaft member 22 via a pair of bearings 28 and 30. The rotor 23 has a rotor body 24 which can be made of aluminum or an aluminum alloy. An annular projection portion 25 inwards projecting in the radial direction is formed on the inner surface of the rotor body 24. Furthermore, an upper bearing 28 is disposed above the projection portion 25, while a lower bearing 30 is disposed below the projection portion 25. At an intermediate portion of the rotor body 24 in the vertical direction, an annular flange portion 26 outwards extending in the radial direction is formed. A polygonal mirror 32 is fastened to the upper portion (the outer diameter of this upper portion is made to be smaller than that of the flange portion 26) of the rotor body 24 in such a manner that it is mounted on an annular mounting portion 26a formed on the upper surface of the flange portion 26. A clamp 34 is fastened to the top end surface of the rotor body 24 by a fixing screw 36. The polygonal mirror 32 is held between the mounting surface 26a of the flange portion 26 and the clamp 34. Since the polygonal mirror 32 is, as shown in FIG. 1, disposed on the outside of the upper bearing 28 in the radial direction, the polygonal mirror 32 can assuredly be supported by the upper bearing 28 so as to be stably rotated. A yoke member 38 formed by magnetic material such as iron is fastened to the outer periphery portion of the flange portion 26. The yoke member 38 formed into an annular shape downwards extends toward the bracket 10. Furthermore, a rotor magnet 42 is fastened to the inner surface of the yoke member 38. The rotor magnet 42 is disposed to confront the stator core 18 in such a manner that a gap portion 40 is formed between the rotor magnet 42 and the flange portion 26.

A frequency generating magnet 44 is fastened to the outer surface of the lower end portion of the yoke member 38. The magnet 44 has an annular projection 44a on the outer surface thereof so that a balance adjusting groove 48 is created by the yoke member 38 and the magnet 44. A weight 46 for adjusting the balance is secured in the adjusting groove 48 which is upwards opened. The weight 46 can be made of proper material such as a synthetic resin.

A frequency generating pattern 50 is annularly disposed in a circuit substrate 16 at a position confronting the frequency generating magnet 44. The frequency generating magnet 44 and the coil pattern 50 constitute a frequency generator which detects, the rotational speed of the rotor 23. A Hall sensor 52 for detecting the rotational angular position of the rotor magnet 42 is disposed in a portion of the circuit substrate 16 confronting the rotor magnet 42.

Each of the bearings 28 and 38 has a seal 54 disposed on the two sides of each of ball members 31 and 33. The seals 54 are respectively fastened to outer rings 56 and 58 of the corresponding upper bearing 28 and the lower bearing 30 in such a manner that the seals 54 are disposed adjacent or positioned in contact with the corresponding inner surface of the inner rings 62 and 63.

A small-diameter washer 60 serving as a seal plate is disposed on the outside of the upper bearing 28, the washer 60 being disposed in contact with the inner ring 62 of the upper bearing 28 on the outside of the inner ring 62. Furthermore, the washer 60 is placed above the upper seal 54 of the upper bearing 28 while forming a small gap therebetween. Therefore, the washer 60 and the seal 54 constitute a labyrinth seal structure capable of preventing flying of lubricant. Furthermore, a large-diameter washer 64 is disposed on the outside of the small-diameter washer 60. The large-diameter washer 64 is secured to the top surface of the shaft member 22 by a fixing screw 67. A disc spring 68 for applying pre-pressure is disposed between the large-diameter washer 64 and the small-diameter washer 60. An annular accommodating recessed portion 66 opened inwards in the radial direction is formed between the large-diameter washer 64 and the small-diameter washer 60. In the accommodating recessed portion 66, the lubricant leaked from the labyrinth seal structure is accumulated by the action of the centrifugal force generated due to rotations of the rotor 23. A lower end portion 74 of the rotor 23 is positioned in an annular groove portion 72 formed between the annular wall member 14 of the bracket 10 and an annular projection portion 70. Therefore, a labyrinth seal is, as shown in FIG. 1, constituted by the lower seal 54 of the lower bearing 30, the annular projection portion 70, the lower end portion 74 of the rotor body 24, the annular groove portion 72 and the annular wall member 14 and the like. As a result, leakage of the lubricant from the lower bearing 30 can be prevented. In the gap portion 40 formed between the flange portion 26 of the rotor body 24 and the rotor magnet 42, the lubricant leaked from the lower labyrinth structure and sticked to the lower surface of the rotor body 24 is accumulated by the centrifugal force generated due to the rotations of the rotor 23. As described above, the leakage of the lubricant in the upper and lower bearings 28 and 30 from the motor can be prevented. Therefore, the blur and contamination of the surface of the polygonal mirror 32 can effectively be prevented.

SECOND EMBODIMENT

Figure 2:
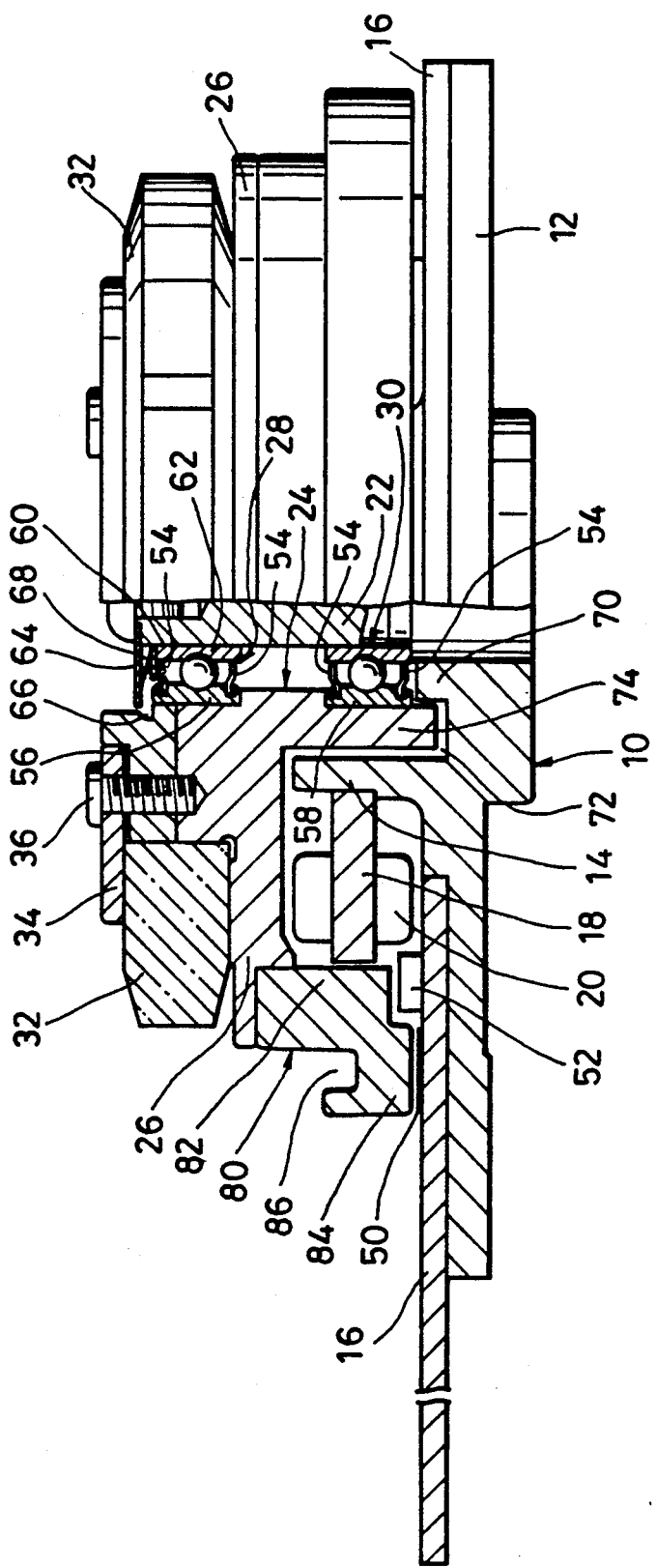
FIG. 2 is a cross sectional partial cutaway view which illustrates a second embodiment of the motor according to the present invention.

FIG. 2 is a cross sectional partial cutaway view which illustrates a second embodiment of the motor according to the present invention. Referring to FIG. 2, elements which are substantially the same as those according to the first embodiment are given the same reference numerals.

Referring to FIG. 2, the second embodiment is arranged in such a manner that a rotor magnet 80 is directly fastened to the outer periphery of the flange portion 26 of the rotor body 24. The rotor magnet 80 comprises a driving magnet portion 82 and a frequency generating magnet portion 84. The driving magnet portion 82 is disposed on the outside of the stator core 18 in the radial direction, while the frequency generating magnet portion 84 is disposed to confront the frequency generating coil pattern 50 on the circuit substrate 16 in the axial direction. A balance adjusting groove 86 is formed in the top surface of the outer periphery of the rotor magnet 80 in such a manner that it opens upwardly.

By integrally forming the rotor magnet 80 as described above, the required number of the elements and manufacturing processes can further be decreased.

The other structures shown in FIG. 2 are substantially the same as those shown in FIG. 1.

THIRD EMBODIMENT

Figure 3:
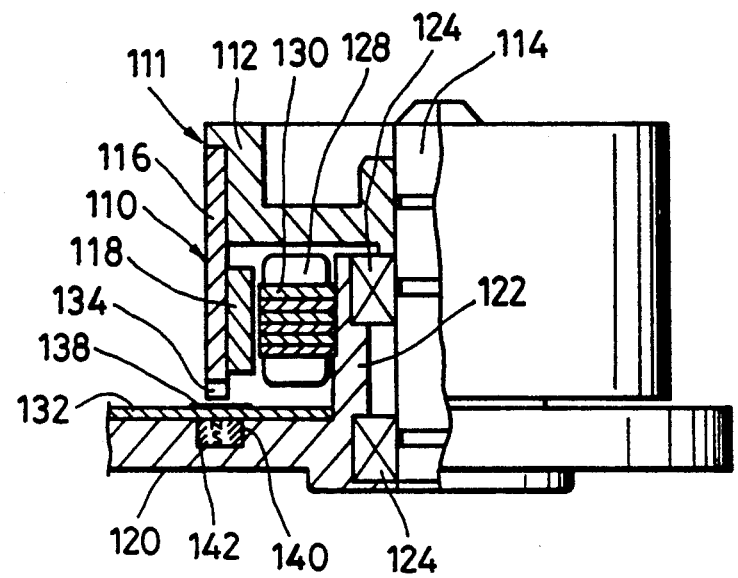
FIG. 3 is a cross sectional partial cutaway view which illustrates a third embodiment of the motor according to the present invention.
Figure 4:
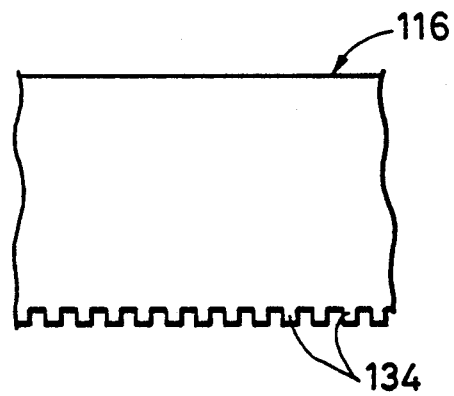
FIG. 4 is a partially developed view which illustrates a portion of a yoke member of the motor shown in FIG. 3.
Figure 5:
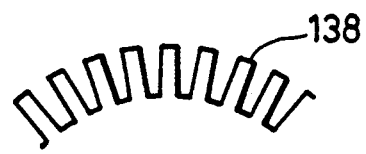
FIG. 5 illustrates a frequency generating pattern for the motor shown in FIG. 3.

FIGS. 3 to 5 illustrate a third embodiment of the motor according to the present invention. The motor according to the third embodiment is used to rotate an optical disk or a photomagnetic disk.

Referring to FIG. 3, the motor according to this embodiment comprises a bracket 120 and a rotor 111 which is capable of rotating with respect to the bracket 120. A cylindrical supporting portion 122 is formed at the central portion of the bracket 120 in such a manner that it projects over the surface of the bracket 120. Furthermore, a rotational shaft 114 is rotatably supported onto the inner surface of the cylindrical supporting portion 122 via a pair of bearings 124. A stator core 130, to which a stator coil 128 is wound, is secured to the outer surface of the cylindrical supporting portion 122.

The rotor 111 is secured to the rotational shaft 114. The rotor 111 has a rotor body 112 which can be made of, for example, aluminum or an aluminum alloy, the rotor body 112 being secured to the top end portion of the rotational shaft 114. A recording disk, such as an optical disk, is detachably fastened to the top surface of the above-described rotor body 112. An annular yoke member 110, which can be made of magnetic material such as iron, is fastened to the outer periphery of the rotor body 112. The yoke member 110 downwards extends toward the bracket 120, the yoke member 110 having, on the inner surface thereof, a rotor magnet 118 confronting the stator core 130.

A flexible circuit substrate 132 is disposed on the inner surface of the bracket 120. An annular end portion of the rotor yoke 116 confronting the above-described circuit substrate 132 is formed into projecting portions 134 (serving as a magnetic flux changing means) at a predetermined pitch as shown in FIG. 4 (which shows the portion of the rotor yoke 116 in a developed manner). A frequency generating coil pattern 138 (serving as a sensing means) is annularly formed to confront the above-described projecting portions 134. The pitch of the coil pattern 138 is made to be substantially the same as that of the projecting portions 134. FIG. 5 is a partial plan view which illustrates the coil pattern 138. An annular magnet 142 (which serves as a magnetic force generating means) is disposed in an annular groove 140 formed in the bracket 120 to confront the coil pattern 138 of the circuit substrate 132 while interposing the circuit substrate 132 therebetween. The direction of the magnetization of the magnet 142 is made to be in the axis of rotation, that is, in a direction confronting the projecting portions 134. Therefore, the portion adjacent to the projecting portions 134 is the north pole, while the opposite portion is the south pole.

When the motor is driven and thereby the rotor yoke 116 is rotated, the magnetic resistance between the magnet 142 and the projecting portions 134 of the yoke member 116 increases/decreases in accordance with the rotation of the projecting portion 134. In accordance with the increase/decrease in the magnetic resistance, the flux which passes through the coil pattern 138 and which reaches the magnet 142 and the projecting portion 134, that is, the flux of a magnetic circuit constituted by the magnet 142 and the projecting portions 134, is changed. Therefore, an AC electric signal the frequency of which is changed in accordance with the increase/decrease in the rotational speed of the rotor 110 is generated in the coil pattern 138. By properly processing the above-described AC electric signal, it can be utilized to detect the rotational speed and the acceleration and the like.

Since the magnet 142 is disposed in the annular groove 140 formed while placing the circuit substrate 132 therebetween in such a manner that the magnet 142 is covered by the circuit substrate 132 serving as a covering member, the adverse influence of the flying magnetic dust upon the operation of reading/writing data to and from the recording disk can be prevented. Furthermore, since one magnetic pole is formed in the magnet 142 to confront the projecting portions 134, intense magnetomotive force can easily be obtained. Therefore, the output level from the coil pattern 138 can easily be raised.

FOURTH EMBODIMENT

Figure 6:
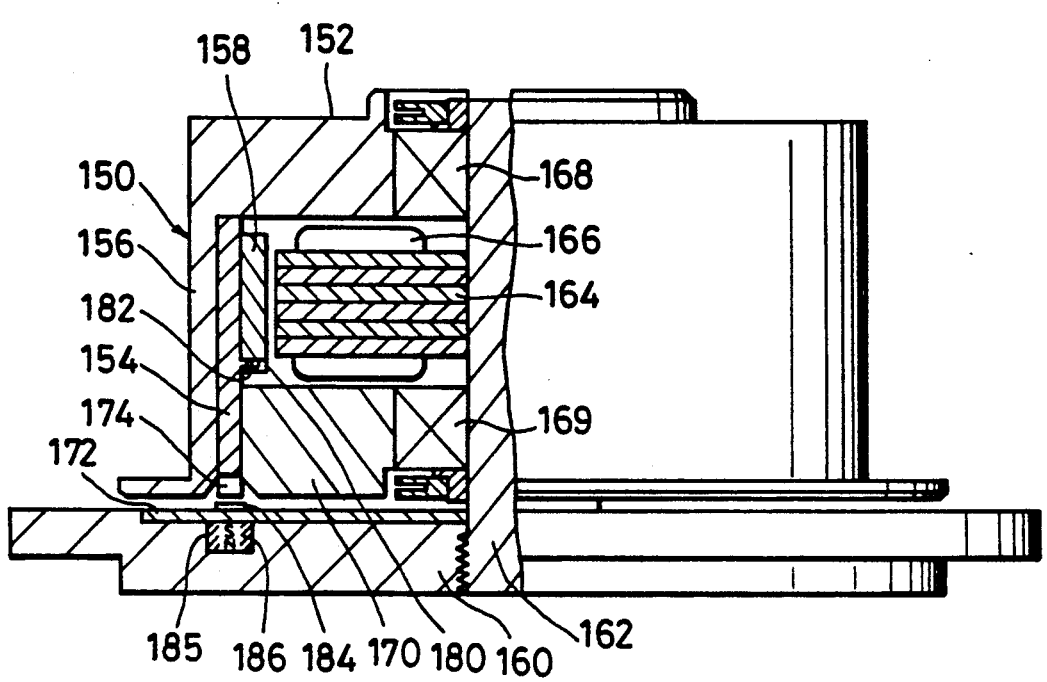
FIG. 6 is a cross sectional partial cutaway view which illustrates a fourth embodiment of the motor according to the present invention.
Figure 7:
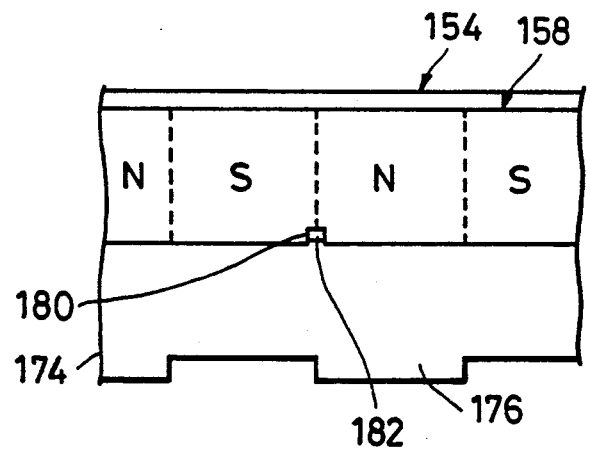
FIG. 7 is a partially developed view which illustrates a portion of a yoke member and a rotor magnet of the motor shown in FIG. 6.

FIGS. 6 and 7 illustrate a fourth embodiment of the motor according to the present invention. The motor according to the fourth embodiment can be used to rotate a hard disk.

Referring to FIG. 6, the motor according to this embodiment has a bracket 160 and a rotor 150 which is able to rotate with respect to the bracket 160. The rotor 150 has a cylindrical rotor hub 152, and a cylindrical yoke member 154 made of magnetic material is disposed inside an outer wall 150 of the rotor hub 152. Furthermore, an annular rotor magnet 158 is fastened to the inner surface of the yoke member 154.

A shaft member 162 is disposed at the central portion of the bracket 160 to project over the surface of the bracket 160. In addition, a stator core 164 is secured to the outer surface of the shaft member 162 to confront the rotor magnet 158. Furthermore, a stator coil 166 is formed around the stator core 164. Bearings 168 and 169 are disposed on the two sides of the shaft member 162 to place the stator core 164 therebetween so that the rotor 150 is rotatably supported via the bearings 168 ad 169. An annular bush 170 is disposed between the lower bearing 169 and the yoke member 154.

A flexible circuit substrate 172 is disposed on the inner surface of the bracket 160. The annular end portion of the yoke member 154 has projecting portions 174 at a pitch which is substantially the same as the alternative magnetic poles of the rotor magnet 158 as shown in FIG. 5 which is a partially developed drawing. According to this embodiment, the portions including the north pole substantially coincide with the projecting portions 176.

It is preferable that the structure be arranged in such a manner that a sole or a plurality of positioning grooves 180 are formed in the lower end portion of the rotor magnet 158 and a sole or a plurality of positioning projections 182 are formed on the inner surface of the yoke member 154 to correspond to the above-described positioning grooves 180. By fitting the positioning projections 182 into the positioning grooves 180, the magnetic poles of the rotor magnet 158 and the projecting portions 174 can be made to correspond to one another. As a result, assembling can be efficiently completed.

A Hall sensor 184 (serving as a sensing means) is disposed on the circuit substrate 172 at a position confronting the lower end surface of the yoke member 154. According to this embodiment, one or more Hall sensors 184 are provided. An annular groove 185 is formed in the bracket 160 to confront the projecting portion 174 while interposing the circuit substrate 172 therebetween. Furthermore, an annular magnet 184 (serving as a magnetic force generating means) is disposed in the annular groove 185. The direction of magnetization of the magnet 186 is arranged to be in the direction which confronts the projecting portion 174 in such a manner that the entire surface of the portion adjacent to the projecting portion 174 is the south pole and the opposite portion is the north pole. A similar effect can be obtained from a structure in which a segment type magnet is disposed at a position which corresponds to the Hall sensor 184 in place of the above-described annular magnet 184.

When the motor is driven and thereby the yoke member 154 is rotated, the magnetic resistance between the magnet 186 and the projecting portion 174 increases/decreases in accordance with the rotation of the projecting portion 174. In accordance with the above-described increase/decrease, the magnetic flux which passes through the Hall sensors 184 and which reaches the magnet 186 and the projecting portion 174, that is, the magnetic flux of a magnetic circuit constituted by the magnet 186 and the projecting portion 174, is changed. As a result, the Hall sensor 184 generates an output signal the level of which is raised/lowered in accordance with the change in the position of the magnetic pole in the rotor magnet 158. In response to the output signal thus-generated, the position of the pole present in the rotor magnet 158, the rotational speed and the acceleration and the like can be detected.

According to the fourth embodiment of the present invention, the magnet 186 is covered with the circuit substrate 172 serving as the covering member. Therefore, the adverse influence of the flying magnetic dust upon the operation of reading/writing data to and from the hard disk can be prevented. Furthermore, since one magnetic pole is formed in the magnet 186 to confront the projecting portions 174, intense magnetomotive force can easily be obtained. Therefore, the output level from the Hall sensor 184 can easily be raised.

Although the third and the fourth embodiments of the present invention are arranged in such a manner that the magnets 40 and 186 are respectively covered by the corresponding flexible circuit substrates 132 and 172, another covering member such as a sealing member (omitted from illustration) may be employed.

Although the third and the fourth embodiment of the present invention are arranged in such a manner that the projections 134 and 174 serving as the flux changing means are formed at the end portions of the corresponding yoke members 116 and 154, the present invention is not limited to this. For example, a structure may be employed which is arranged in such a manner that an independent ring member having a projection is secured to the yoke member.

Although the invention has been described in its preferred form with a certain degree of particularity, it is understood that the present disclosure of the preferred form has been changed in the details of construction and the combination and arrangement of parts may be resorted to without departing from the spirit and the scope of the invention as hereinafter claimed.

We claim:

1. A scanning motor comprising:
   a bracket;
   a shaft member secured to said bracket;
   a rotor body rotatably supported by said shaft member via a pair of bearings;
   a yoke member fastened to a lower portion of said rotor body;
   a rotor magnet fastened to the inner surface of said yoke member;
   a frequency generating magnet fastened to the lower end portion of said yoke member and forming a balance adjusting groove with said yoke member;
   a stator fastened to said bracket to confront said rotor magnet;
   and a polygonal mirror fastened to an upper portion of said rotor body.

2. A scanning motor according to claim 1, wherein said polygonal mirror is disposed on the outside of either of a pair of said bearings.

3. A scanning motor according to claim 1, wherein an annular accommodating recessed portion for accommodating leaked lubricant is formed at a position on the outside of either of a pair of said bearings.

4. A scanning motor according to claim 1, wherein a seal plate is disposed at a position on the outside of either of a pair of said bearings and a seal provided for either of a pair of said bearings and said seal plate constitute a labyrinth structure.

5. A motor comprising:
   a bracket;
   a rotor which can be rotated with respect to said bracket;
   magnetic force generating means disposed in said bracket;
   magnetic flux changing means fastened to said rotor to confront said magnetic force generating means and arranged to change the magnetic force generated by said magnetic force generating means;
   sensing means disposed in a magnetic circuit constituted by said magnetic force generating means and said magnetic flux changing means and arranged to sense the change in the magnetic flux taken place in said magnetic circuit; and
   a covering member for covering said magnetic force generating means.

6. A motor according to claim 5, wherein a recessed portion is formed in said bracket, said magnetic force generating means is accommodated in said recessed portion and a flexible circuit substrate is disposed to cover said magnetic, force generating means.

7. A motor according to claim 5, wherein said magnetic flux changing means is composed of a ring member made of magnetic material and projections are formed at intervals in a circumference direction in a portion confronting said magnetic force generating means.

8. A motor according to claim 5, wherein the circumferential directional width of each of said projections is substantially the same as the circumferential directional width of a specific pole of a rotor magnet for rotating said rotor.

9. A motor according to claim 5, wherein said sensing means, is a frequency generating pattern.

10. A motor according to claim 9, wherein said magnetic force generating means is composed of an annular permanent magnet disposed to correspond to said frequency generating pattern.

11. A motor according to claim 5, wherein said sensing means is Hall device.

12. A motor according to claim 11, wherein said magnetic force generating means is composed of a segment type permanent magnet disposed to correspond to said hole device.

13. A scanning motor comprising;
   a bracket;
   a shaft member secured to said bracket;
   a rotor body rotatably supported by said shaft member via a pair of bearings;
   a stator fastened to said bracket;
   a rotor magnet fastened to a lower portion of said rotor body;
   said rotor magnet having a driving magnet portion disposed at a position confronting said stator and a frequency generating magnet portion disposed at a position confronting a frequency generating pattern of a circuit substrate;
   a balance adjusting groove in the top surface of said rotor magnet, and
   a polygonal mirror fastened to an upper portion of said rotor body.

14. A scanning motor according to claim 13, wherein said polygonal mirror is disposed on the outside of either of a pair of said bearings.

15. A scanning motor according to claim 13, wherein an annular accommodating recessed portion for accommodating leaked lubricant is formed at a position on the outside of either of a pair of said bearings.

16. A scanning motor according to claim 13, wherein a seal plate is disposed at a position on the outside of either of a pair of said bearings and a seal provided for either of a pair of said bearings and said seal plate constitute a labyrinth structure.

17. A motor comprising:
   a bracket;
   a shaft member secured to said bracket;
   a rotor rotatably supported by said shaft member via a pair of bearings;
   a rotor magnet fastened to said rotor; and a stator fastened to said bracket to confront said rotor magnet, wherein said rotor has a rotor body made of aluminum or an aluminum alloy and a yoke member provided for said rotor body and made of magnetic material, a rotor magnet is fastened to the inner surface of said yoke member, a frequency generating magnet is fastened to the outer surface of said yoke member and a balance adjusting groove is formed by said frequency generating magnet and said yoke member.

* * * * *